July 21 1925.
E. E. SLICK
METHOD OF ROLLING
Filed July 24, 1922
1,546,800
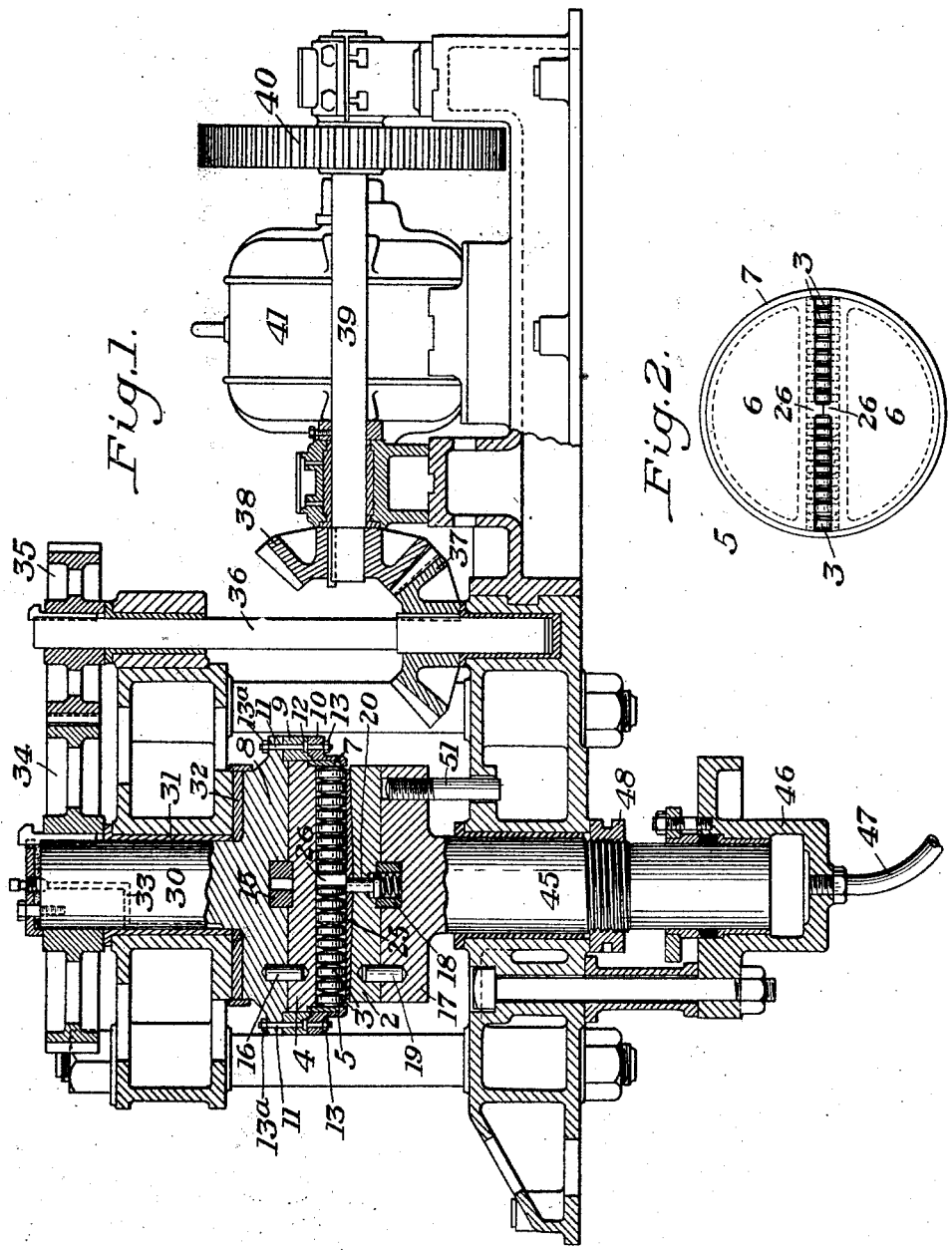

Patented July 21, 1925.

1,546,800

UNITED STATES PATENT OFFICE.

EDWIN E. SLICK, OF PITTSBURGH, PENNSYLVANIA.

METHOD OF ROLLING.

Application filed July 24, 1922. Serial No. 577,037.

*To all whom it may concern:*

Be it known that I, EDWIN E. SLICK, a resident of Pittsburgh, Allegheny County, Pennsylvania, have invented a new and useful Improvement in Methods of Rolling, of which the following is a full, clear, and exact description, reference being had to the accompanying drawings, forming part of this specification, in which—

Figure 1 is a side elevation taken partly in section of one type of machine arranged to carry out my process; and Figure 2 is a plan view of the nested rollers and cage.

The present invention relates to circular rolling, and is designed to provide a new and improved method therefor. In carrying out my improved method, I support a blank on a work-supporting member and employ a thrust member and impart relative rotation to the members around a stationary axis and roll the blank in an annular zone or zones by means of rolling elements between the members holding the rolling elements in fixed relation to the center of rotation, these members moving in circular paths relative to the blank. I may rotate the work-supporting member or the thrust member or both, and I preferably hold the rolling elements in the same position relative to the center of rotation by means of a cage or holding device. The rolling elements are preferably imperforate and the cage is arranged to hold them in the same relative annular positions while rotation is carried on for at least one of the members around the fixed axis.

The invention is specially designed for imparting a taper to blanks cut from a plate, which blanks may be round, square or of other shape, although the invention may be used for imparting other cross sectional shapes by the circular rolling method. The blank may be either of the same thickness throughout or of varying thickness, and may be of different shapes.

I will now describe one machine for carrying out my invention, this being specially designed for rolling tapered blanks for wheel bodies.

Referring to the machine illustrated in Figure 1 of the drawings, the blank which is illustrated as a previously heated flat plate or sheet metal disk is carried on a work support 2. This work support is preferably dished, as shown in Figure 1, if it is desired to give a taper to the blank. The blank is rolled into a tapered disc by means of a plurality of rollers 3, pressed against the work by a thrust plate 4, which is rotated relatively to the work support 2. The rollers 3 are loosely mounted in a cage, indicated generally by reference numeral 5. This cage comprises two semicircular blocks 6, the inner edges of which are concave to fit around and guide the rollers 3. A band 7 fits around the two blocks 6 and holds them together. The thrust plate 4 is mounted on a rotating head 8, and is made of hardened steel to withstand the wear from the rollers. The thrust piece 4 and cage 5 are held on the head 8 by means of rings 9 and 10, which are supported on the head 8 by means of bolts 11. The ring 9 has countersunk bolt holes for the flanges 12 on the bolts which support it. Threaded on the lower ends of the bolts 11 are nuts 13, which support the ring 10. By removing the nuts 13, the ring 10 can be taken off and the cage 5 released. Then, if it is desired to take off the thrust plate 4, it can be taken off by loosening the nuts 13ª.

A centering stud 15 centers the thrust plate 4 on the head 8 and a pin 16 holds the thrust plate and head against relative rotation. The cage 5 is held so that it can freely rotate in its supporting ring 10. Sufficient clearance is provided between the cage 5 and the work so that the cage may turn freely relative thereto.

The work-supporting plate 2 is made of hardened steel or cast chilled iron and is supported on a head 17. It is centered on the head by means of a hollow stud 18, and is prevented from rotating relatively to the head 18 by means of a pin 19. A spring-pressed stud 20 projects through the work support 2 and into the hole drilled in the center of the blank for the purpose of centering the blank on the work support.

The blank to be operated upon may be a flat plate or sheet metal disc with a hole bored through it to receive the stud 20. The blank may be of uniform gauge and is smaller in diameter than the completed tapered disk into which it is rolled. The blank may, however, be of shapes other than circular. For example, it might be square. Moreover, it need not necessarily be drilled for the stud 20, but may be solid, in which case the centering stud is unnecessary. During the rolling operation, the two heads 8 and 17 are thrust against each other under pressure and are relatively rotated so that the rollers 3 roll around and over the top of the work. The completed blank after it is rolled is indicated by reference numeral 25. The rollers 3 are loosely mounted in the cage and are frictionally driven by contact with the relatively moving thrust plate 4 and the blank 25.

As shown in Figure 1, the rollers at each side of the axis of rotation are preferably so spaced that the rollers at one side will not track with the rollers on the other side. This prevents ridges from being rolled in the work at points between the separate rollers. As shown in this figure, the two series of rollers on opposite sides of the center are supported by a spacer 26, formed on the blocks 6 of the roller-supporting cage. This spacer block 26 is a little to one side of the axis of rotation. As shown in the drawings there are nine rollers at the left of the axis of rotation and eight at the right. This arrangement insures that the radius from the axis of rotation to the point of separation between two rollers at one side of the center is equal to the radius from the axis of rotation to the middle of a roller on the opposite side; this, as heretofore explained, preventing the rollers from tracking and forming ridges in the work. As shown in the drawings, the end faces of the rollers 3 are slightly bulged at the center, this bulging being somewhat exaggerated in the drawings for the purpose of illustration. The rollers, therefore, come in end to end contact only at their centers, so that there is substantially no friction between adjacent rollers. Thus each roller is permitted to assume its own speed and is not subjected to frictional drag by an adjacent roller which is moving slower or faster.

It is found to be advantageous in work of this character to employ rollers of small diameter, because the small diameter roller has a smaller surface of rolling contact with the work. Therefore, the thrust of the rollers against the work is concentrated in a smaller area and the blank rolled out more efficiently than would be the case if larger diameter rollers were used. Since the rollers 3 are subjected to a considerable thrust, it is desirable that they be made solid. The use of the cage 6 permits small solid rollers to be used. The cage holds the rollers in alignment and prevents any roller from moving sidewise out of its end to end alignment with the other rollers. With the cage it is unnecessary to bore the rollers to receive any shaft for holding them in alignment or supporting them, thus permitting the rollers to be made solid and of a maximum strength.

The head 8 is mounted in the cross pediment of the machine so as to rotate. As shown in the drawings, the head 8 is provided with a vertical shaft 30, extending through a bushed bearing 31, while a plate 32 forms a vertical thrust bearing for the head 8. The bearings are lubricated through the oil groove 33. Splined to the head of the shaft 30 is a gear 34, which is driven by a pinion 35. The pinion 35 is carried on a shaft 36 which, at its lower end, has a bevel gear 37, driven by a bevel gear 38 on a shaft 39, which is driven through the reduction gearing 40 by electric motor 41.

The head 17 which carries the work support 2 is vertically movable and is forced by hydraulic pressure against the rollers 3. The head 17 has a plunger 45, which enters a hydraulic cylinder 46, supplied with fluid under pressure through a pipe 47. An adjustable collar 48 on plunger 45 limits its upward movement. A pin 51 extends from the head 17 into a stationary part of the machine to prevent the head 17 from rotating.

In carrying out my improved method with this machine, the heated blank is placed on the work support 2 and then fluid under pressure is admitted into the hydraulic cylinder so as to force the work support and work up against the rollers 3. The head 8 with the thrust plate 4 is rotated as the work support is moved up under hydraulic pressure so that the blank is rolled out under pressure, forming in this case a tapered disc of larger diameter.

During the operation, the rollers move in circular or annular paths relative to and from the blank and are held in fixed relation to the center of rotation and also preferably in the same relative angular positions, the rotation occurring around a fixed axis. During this operation, the blank is spread and rolled to the desired shape, in this case, the blank being tapered toward its edge.

While the heads 8 and 17 are shown as rotating relatively around a vertical axis, it is obvious that such axis of rotation might be horizontal or inclined if more convenient in the particular machine to be built. While the machine is illustrated as operating upon circular blanks to roll them into tapered disks, other blanks may be used and other shapes rolled. For example, a square blank may be used and a shape rolled from it and the projecting corners trimmed off, if desired. Instead of a tapered shape, other shapes may be rolled and the rolling may be restricted to a more limited annular area than that indicated in the drawing.

My improved method may be carried out with other types of apparatus, such for example, as the preferred forms of apparatus shown in Patent Number 1,423,268 granted to me July 18, 1922.

I claim:

1. In the method of rolling, the steps consisting in supporting a blank on a work-supporting member, forcing against the blank a system of rolling elements, imparting relative rotation to the blank and rolling elements around a fixed axis, and holding the rolling elements in a cage in fixed relation relative to the center of rotation, substantially as described.

2. In the method of rolling, the steps consisting of supporting a blank on a work-supporting member, forcing against the same a set of rollers, imparting relative rotation to the rollers and blank around a fixed axis, and holding the rollers in a cage in fixed relation to the center of rotation and in the same relative radial positions, substantially as described.

3. In the method of rolling, the steps consisting of fastening a heated blank on a work-supporting member, forcing against the work a set of rolling elements, some of which are nearer the work-supporting member than others thereof, imparting relative rotation to the rollers and blank around a fixed axis, and holding the rollers in a cage in the same relative radial positions, substantially as described.

4. In the method of rolling, the steps consisting of fastening a heated blank of substantially the same thickness throughout upon a work-supporting member, forcing against the same a set of rolling elements, imparting relative rotation to the rolling elements and blank around a fixed axis, and maintaining the rollers in a cage in the same relative radial positions while rolling and spreading out the blank by the circular travel of the rollers relative to the work, substantially as described.

5. In the method of rolling, the steps consisting in supporting a blank on a work-supporting member, forcing against the blank a set of rolling elements arranged to travel in overlapping annular paths upon relative rotation of the blank and rolling elements, and imparting relative rotation to the rolling elements and blank around a fixed axis, substantially as described.

6. In the method of rolling, the steps consisting in supporting a blank on a work-supporting member, forcing against the blank a set of rolling elements, imparting relative rotation to the rolling elements and blank around a fixed axis, and holding the rolling elements in a cage in fixed relation to the axis of rotation and to traverse overlapping annular paths upon said relative rotation between the rolling elements and blank, substantially as described.

In testimony whereof I have hereunto set my hand.

EDWIN E. SLICK.